United States Patent [19]

Linville

[11] Patent Number: 4,488,635

[45] Date of Patent: Dec. 18, 1984

[54] METHOD AND APPARATUS FOR WEIGHING A PRODUCT SUSPENDED FROM A TRAVELING CONVEYOR

[76] Inventor: Richard D. Linville, P.O. Box 7, Pleasant Valley, Iowa 52767

[21] Appl. No.: 460,946

[22] Filed: Jan. 25, 1983

Related U.S. Application Data

[63] Continuation of Ser. No. 227,141, Jan. 21, 1981, abandoned.

[51] Int. Cl.³ ............................................ G01G 19/14
[52] U.S. Cl. ....................................... 198/504; 177/50; 177/52; 177/145; 209/592
[58] Field of Search ................ 198/504, 505, 680; 177/50, 52, 53, 119, 145, 163; 209/592–595, 645

[56] References Cited

U.S. PATENT DOCUMENTS

| | | | |
|---|---|---|---|
| 1,902,512 | 3/1933 | Mehl | 198/504 |
| 2,938,626 | 5/1960 | Dahms | 177/52 |
| 3,997,013 | 12/1976 | Brook | 177/50 |
| 4,163,488 | 8/1979 | Brook | 198/504 |
| 4,300,644 | 11/1981 | Meyn | 198/504 |

Primary Examiner—Joseph E. Valenza
Attorney, Agent, or Firm—Edmond T. Patnaude

[57] ABSTRACT

A shackle supporting the product to be weighed is lifted off the pendant of an overhead conveyor by a chain driven in synchronism with the conveyor, and the chain then carries the shackle and the product which it is supporting across a weighing platform before lowering the shackle back onto the pendant.

11 Claims, 4 Drawing Figures

METHOD AND APPARATUS FOR WEIGHING A PRODUCT SUSPENDED FROM A TRAVELING CONVEYOR

This application is a continuation of application Ser. No. 227,141 filed Jan. 21, 1981 now abandoned.

The present invention relates in general to the art of weighing products supported by shackles from an overhead conveyor, and it relates in particular to a new and improved method and apparatus which utilizes a one-piece inexpensive shackle and enables more precise weight measurements of products hanging from relatively high speed conveyors.

BACKGROUND OF THE INVENTION

In the prior art, products, such as poultry carcasses, have been weighed during processing by suspending the birds from articulated shackles having rollers which roll up a ramp and are then towed across a weighing device by the conveyor. Errors in weighing are introduced by this type of system for several reasons including the uneven and bumping action of the rollers as they roll along the ramp, dragging of the shackles against the sides of the ramp and variations in the weights of the shackles themselves. The variations in the weights of the shackles result primarily from the complex nature of the shackles.

Another prior art weighing system incorporates means for lifting each shackle with its product from the conveyor at a location where the conveyor makes a sharp turn. While the shackles used in this type of weighing system do not employ rollers and are simpler in construction than are the articulated types, other weighing errors are introduced by virtue of the fact that the product is being weighed as it swings around the turn. Also, since such a system can only be used at locations where the conveyor makes a sharp turn, installation is often times difficult.

It would be desirable, therefore, to provide a weighing system which uses a simple and inexpensive, lightweight shackle having no moving parts, and to use such a shackle in conjunction with a load cell or other weighing device mounted at a location where the conveyor is traveling in a straight line.

SUMMARY OF THE INVENTION

Briefly, there is provided in accordance with the teachings of the present invention a new and improved weighing system in which shackles suspended from an overhead conveyor are lifted off the conveyor by a chain which is located beneath the conveyor at the weighing station and which is driven at the same speed as the conveyor. After being lifted off the conveyor each shackle rests on the chain and is carried by the chain across a load cell or other weighing device. After traversing the load cell the shackle is lowered back onto the conveyor which may carry it to one or more succeeding operating stations.

GENERAL DESCRIPTION OF THE DRAWING

The present invention will be better understood by a reading of the following detailed description taken in connection with the accompanying drawing wherein.

DETAILED DESCRIPTION OF THE INVENTION

Figure 1:
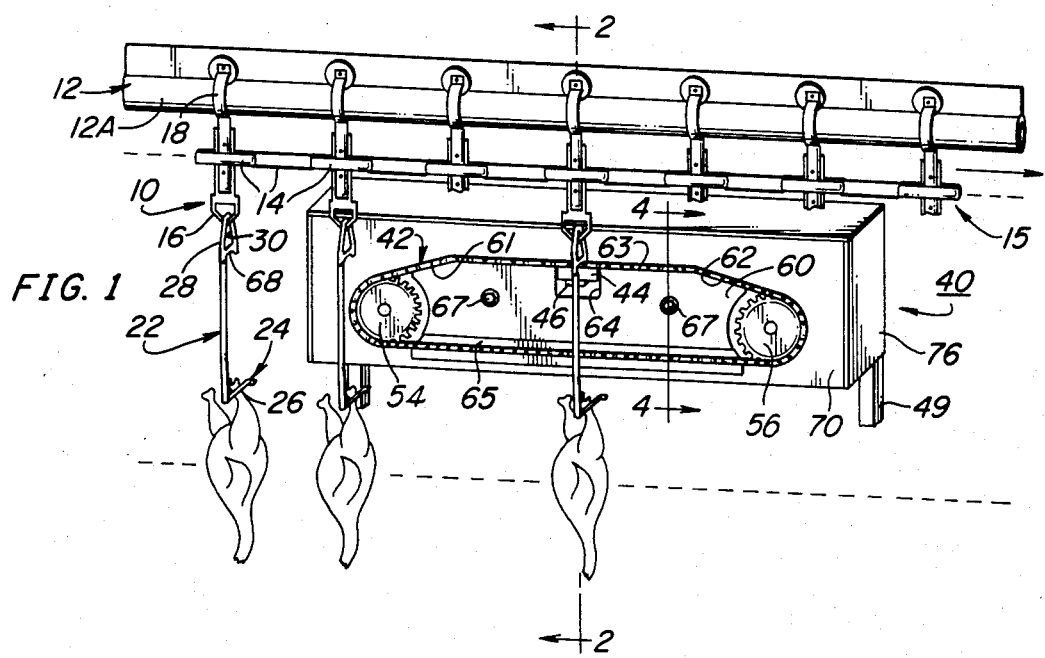
FIG. 1 is a perspective view of a weighing station embodying the present invention.
Figure 2:
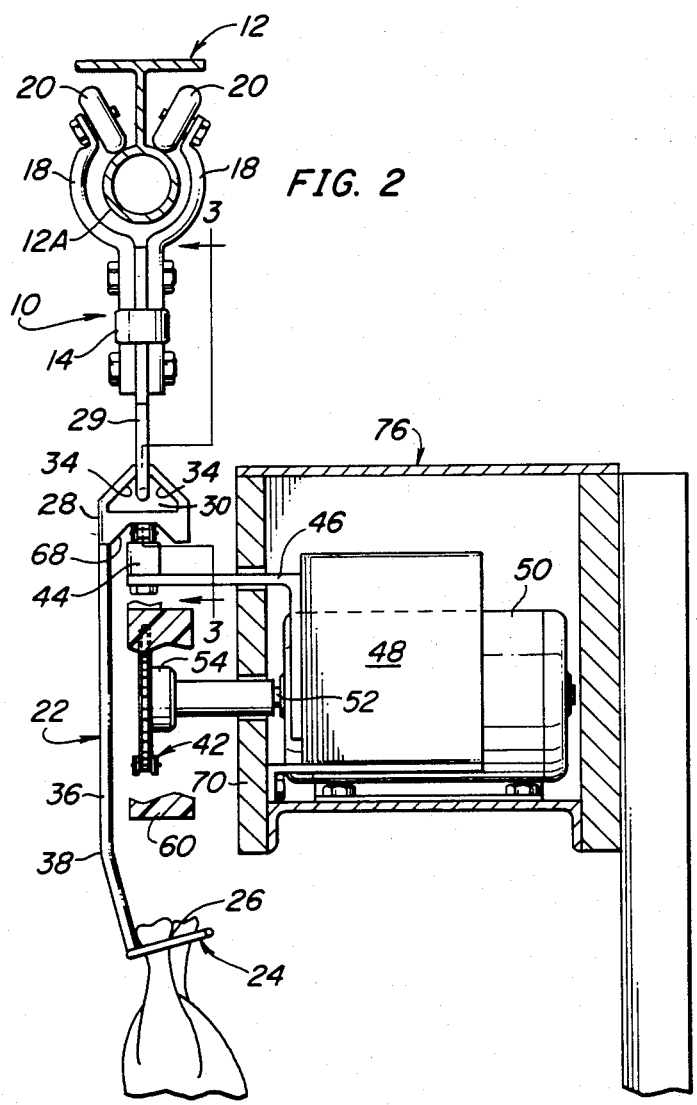
FIG. 2 is a vertical cross-sectional view of the weighing station taken along the line 2—2 in FIG. 1 and particularly showing a shackle traversing the weighing device.

With reference to the drawing, a plurality of shackle supports 10 are suspended from an overhead rail 12 and connected to respective ones of a plurality of interconnected links 14 forming a main conveyor drive chain 15. The conveyor drive chain is driven from left to right as shown in FIG. 1 by any suitable means such as an electric motor (not shown). The shackle supports 10 are commonly connected to the drive chain on six-inch centers and are preferably identical. As may be seen from the drawing, each shackle support 10 includes an apertured pendant 16 fastened to one of the links 14 of the drive chain 15. A pair of yoke-like body members 18 as best shown in FIG. 2 straddle the pendant and extend through the associated chain link 14. These body members 18 are bolted together on opposite sides of the upper shank portion of the pendant and extend upwardly and partially around a cylindrical pipe 12A, which forms a part of the rail 12. As shown best in FIG. 2, a pair of rollers 20 are rotatably mounted to the body members 18 on axes extending radially of the pipe 12A. It may thus be seen that the shackle supports 10 are suspended from the rail assembly 12 on the rollers 20, and are towed along beneath pipe 12A by the drive chain 15.

In order to attach the product to the conveyor, a plurality of shackles 22 are respectively suspended from the shackle supports 10. The particular shackle shown in the drawings is a weighing and sorting shackle designed particularly for use with poultry carcasses, and it thus includes a bifurcated lower end 24 which receives the portion of one leg of a bird immediately above the knuckle. Therefore with the bird inverted, as shown, the knuckle rests on top of the tines 26 whereby the bird hangs from the shackle 22. At the upper end of the shackle 22 is a support plate 28 having a generally triangular opening 30 therein. The pendant 16 has a V-shaped support arm 29 which extends through the opening 30 and engages the aperture defining surface 32 at the center of the plate 28 to support the shackle 22 in a manner permitting the shackle to swing freely both in the direction of travel of the conveyor and in a direction which is lateral thereto. The opening 30 is substantially longer in the direction of conveyor travel than is the corresponding dimension of the pendant 16, and the tapered fore and aft walls 34 of the opening 30 provide guide surfaces which centrally locate the plate 28 relative to the support pendant 16. The shackle further includes a rigid rod 36 which is affixed at the top to the plate 28 and at the bottom to the tines 26. The rod 36 is provided with a bend at an intermediate location 38 or is otherwise shaped so that the bird or other product being carried by the shackle is centrally located beneath the pendant 16.

In a typical poultry processing plant the shackle supports 10 are mounted to the chain 15 on six inch centers and the chain travels at a speed in the range of about one foot to three feet per second. Different types of shackles are used to carry the birds through different ones of the processing stations. For example, in the killing and eviscerating stages the birds are suspended from the shackles by both legs and in one case they hang by the feet and in the other case by the knuckles, wherefore different types of shackles are used for these two operations. The shackle 22 is of a type which carries the birds through the sorting and weighing stations where the birds are customarily held by the knuckle on only one leg. Referance is made to my copending application Ser. No. 227,140 filed Jan. 21, 1981, now U.S. Pat. No. 4,372,009 for a further description of a shackle of the type shown herein. It should be understood, therefore, that the invention can be used with many different types of shackles, and that the shackle 22 is shown and described for purposes of illustration only. The invention finds application with substantially any type of shackle which carries a product through a weighing station.

In accordance with the present invention, a weighing device 40 is mounted below the conveyor for intercepting the shackles 20 as they move along the conveyor lifting them off the conveyor and for then weighing each shackle and the bird which it carries. As is described in greater detail hereinafter, as each shackle traverses the weighing station it is lifted a short distance off the associated pendant and carried by a weighing conveyor, which may be in the form of a precision chain 42, across a weighing platform 44. As shown, the platform 44 is carried by bracket arm 46 mounted to the sensor element of a load cell 48. It may thus be seen that as a bird is being weighed the weight resting on the platform 44 is the combined weights of the bird itself, of the shackle 22 and of the length of chain resting on the platform 44. Inasmuch as the weights of the shackle and chain are constant they constitute a fixed tare which may be subtracted from the total weight measured by the load cell to provide an accurate measurement of the weight of the bird. The weighing conveyor 42 is preferably a precision made chain and it moves over smooth guide surfaces at a uniform rate of speed whereby neither the chain nor the shackles which it carries move irregularly or bounce as they pass across the weighing platform 44. As a consequence, irregular shackle movements which occur when a shackle is towed across a weighing platform by a main conveyor are essentially eliminated in the system of the present invention. It will be noted that the pendant arm 29 is provided with a notch 29A which is slightly wider than the thickness of the shackle support plate 28 and which prevents twisting of the shackle 22 relative to the pendant. Sufficient clearance is provided between the sides of the notch 29A and the plate 28 to permit the shackle to remain vertical as it travels up and down through the weighing station.

Considered in greater detail, the weighing station 40 comprises a cabinet 6 mounted by any suitable means such as a plurality of legs 49. In addition to the load cell 48, an electric drive motor 50 is mounted in the cabinet 76 and its shaft 52 extends through the front face 53 of the cabinet 76. A drive sprocket 54 located directly below the rail 12 is mounted to the shaft 52 of the motor 50. A follower sprocket 56 is journaled to the cabinet and is aligned with the drive sprocket 54 beneath the rail assembly 12.

Figure 4:
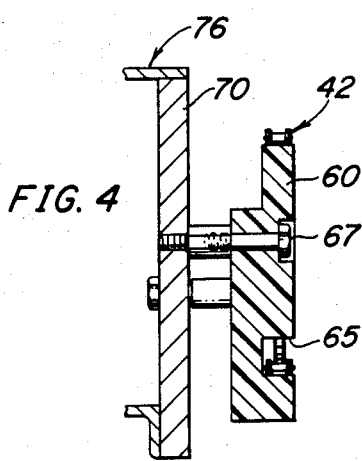
FIG. 4 is a sectional view taken along the line 4—4 in FIG. 1 and particularly showing the chain guide.

A chain guide member 60 suitably formed of Nylon or other plastic is mounted to the front face 70 of the cabinet by a plurality of bolts 67 and has a first ramp surface 61 and a second ramp surface 62 spaced apart by a horizontal, intermediate guide surface 63. A rectangular notch 64 is provided at the center of the guide surface 63 and receives the weighing platform 44. Although the platform 44 is free to move up and down in the notch 64, a close, precision fit is provided between the platform 44 and the adjacent edges of the notch so that the chain passes smoothly over the leading and trailing edges of the platform wherefor no bouncing or vibration occurs. The guide member 60 has a horizontal groove 65 (see FIG. 4) for guiding the chain links moving from the drive sprocket 54 to the sprocket 56.

Figure 3:
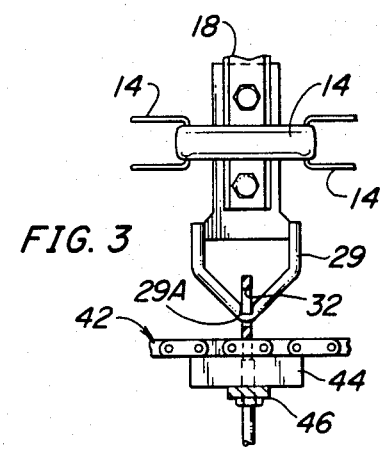
FIG. 3 is a fragmentary, sectional view taken along the line 3—3 in FIG. 2 and showing a shackle being carried across the weighing platform.

In oder to lift the shackles 22 off the pendants 16 before the shackles are carried across the weighing platform 44, the ramp surface 61 and the horizontal guide surface 63 are located so as to support the chain 42 at a position where it intercepts the bottoms of the shackle support plates 28 and lifts them a short distance off the pendant as shown in FIG. 3. To this end the shackle support plate 28 is provided at the bottom with the recess 68 having tapered side walls for guiding the shackle onto the chain when the plate is towed against the chain at a place where the chain is rising up the ramp 61. The chain 42 is driven at the same speed as the conveyor chain 15 is traveling, and after the support plate 28 of a shackle abuts the chain 42 the shackle is lifted by the chain 42 until the shackle support pendant 16 and the shackle are mutually separated although they remain linked together as shown in FIGS. 2 and 3. The shackle is then carried solely by the chain 42 across the adjacent horizontal guide surface 63 and then across the weighing platform where its weight and that of the product which it carries is measured. The shackle is then moved off the weighing platform and carried by the chain 42 as it moves down the ramp 62 thereby lowering the plate 28 until it is again entirely supported by the pendant 16. The opening 30 in the plate 28 is substantially wider than the thickness of the support arm of the pendant 16 to prevent mutual engagement between the plate 28 and the pendant 16 as the forward speed of the shackle slows down as it climbs the ramp 61 and speeds up as it descends the ramp 62.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for weighing products carried by shackles which are suspended in spaced relationship from an overhead traveling conveyor, comprising
    a single, endless weighing conveyor element having a working run disposed below and in the same vertical plane as a portion of said overhead conveyor and traveling in the same direction and at substantially the same speed as said portion of said overhead conveyor,
    each of said shackles being removably suspended from said overhead conveyor and including a shackle support portion having a surface which is adapted to rest on said weighing conveyor element,
    said weighing conveyor element having an upwardly sloping ramp portion for intercepting said shackle support portions of said shackles and for lifting said shackles from said overhead conveyor as they are carried up said ramp portion, said shackles further including a product support portion extending vertically along one side and extending laterally beneath said conveyor element for supporting a product below said conveyor element in vertical alignment with said vertical plane, and a weighing platform across which said conveyor element travels after traveling up said ramp portion, said weighing platform supporting a length of said conveyor element that is less than the distance between adjacent shackles.

2. Apparatus according to claim 1, wherein said weighing conveyor element has a downwardly extending ramp portion for lowering said shackles onto said overhead traveling conveyor after they have traveled across said weighing platform.

3. Apparatus according to claim 2, wherein said weighing conveyor element is a precision chain.

4. Apparatus according to claim 2, wherein said overhead conveyor comprises a plurality of spaced shackle supports each having a hook portion from which a respective one of said shackles is removably suspended.

5. Apparatus according to claim 2, further comprising a planar guide member mounted below said overhead conveyor in said vertical plane and having an upper edge surface supporting said conveyor element, said weighing platform being disposed in an opening in the upper edge of said guide member.

6. Apparatus according to claim 5, comprising a housing, said planar guide member being mounted to one wall of said housing, an electric motor located within said housing, and a drive element for said weighing conveyor element disposed at one end of said guide member and driven by said electric motor.

7. Apparatus according to claim 6, wherein said product support elements are below said guide member as said shackles travel across said weighing platform.

8. Apparatus according to claim 6, comprising a load cell mounted within said housing, said weighing platform extending from said load cell.

9. Apparatus for weighing products carried by shackles which are suspended in spaced relationship from an overhead traveling conveyor, comprising in combination, a single, endless weighing conveyor element, a planar guide disposed below and in the same vertical plane as a portion of said conveyor, said weighing conveyor element extending around the peripheral edge of said guide member and being disposed in said vertical plane, drive means for driving said weighing conveyor element at the same speed as said overhead traveling conveyor, each of said shackles being removably suspended from said overhead conveyor and having a downwardly facing surface which is adapted to rest on said weighing conveyor element, said planar guide having an upwardly sloping ramp portion over which said weighing conveyor element travels to intercept said downwardly facing surfaces of said shackles and to lift said shackles from said overhead conveyor as they are carried up said ramp portion by said weighing conveyor, said shackles having a product support portion depending along one side of said weighing conveyor element and said guide and a lower end portion extending laterally from said product support portion beneath said weighing conveyor element and said guide for supporting a product to be weighed below said guide is vertical alignment with said vertical plane, and a weighing platform across which said weighing conveyor element travels after traveling up said ramp portion, said weighing platform supporting a length of said weighing conveyor element that is less than the distance between adjacent shackles.

10. Apparatus for weighing according to claim 9 wherein said product support portion of said shackle is a single bar having a bend therein, and said lower end portion is birfucated.

11. Apparatus for weighing products carried by shackles which are suspended in spaced relationship from an overhead traveling conveyor, comprising a single, endless weighing conveyor element having a working run disposed below and in the same vertical plane as a portion of said overhead conveyor and traveling in the same direction and at substantially the same speed as said portion of said overhead conveyor, each of said shackles being removably suspended from said overhead conveyor and including a shackle support portion having a surface which is adapted to rest on said weighing conveyor element, said weighing conveyor element having an upwardly sloping ramp portion for intercepting said shackle support portions of said shackles and for lifting said shackles from said overhead conveyor as they are carried up said ramp portion, said shackles further including a product support portion extending vertically along one side and extending laterally beneath said conveyor element for supporting a product below said conveyor element in vertical alignment with said vertical plane, and means for weighing said product while it is supported by said conveyor element.

* * * * *